US008660670B2

(12) United States Patent
Freed

(10) Patent No.: US 8,660,670 B2
(45) Date of Patent: Feb. 25, 2014

(54) CONTROLLER WITH ARTIFICIAL INTELLIGENCE BASED ON SELECTION FROM EPISODIC MEMORY AND CORRESPONDING METHODS

(76) Inventor: Sam Freed, Jerusalem (IL)

( * ) Notice: Subject to any disclaimer, the term of this patent is extended or adjusted under 35 U.S.C. 154(b) by 408 days.

(21) Appl. No.: 12/876,266

(22) Filed: Sep. 7, 2010

(65) Prior Publication Data

US 2011/0060425 A1 Mar. 10, 2011

Related U.S. Application Data

(60) Provisional application No. 61/241,044, filed on Sep. 10, 2009.

(51) Int. Cl.
*G05B 13/02* (2006.01)
(52) U.S. Cl.
USPC ............................................. 700/49; 700/108
(58) Field of Classification Search
USPC ......... 700/2, 9, 20, 28, 29, 30, 33, 34, 47–51, 700/108–110
See application file for complete search history.

(56) References Cited

U.S. PATENT DOCUMENTS 6,490,519 B1 * 12/2002 Lapidot et al. ................ 701/117
7,103,460 B1 * 9/2006 Breed .......................... 701/32.9

OTHER PUBLICATIONS

Ros R et al :"A case-based approach for coordinated action selection in robot soccer", Artificail Intelligence, Elsevier Science Publisher B.V.,Amsterdam, NL, vol. 173, No. 9-10, Jun. 1, 2009, pp. 1014-1039.
Mirza N A et al :"Developing social action capabilities in a humanoid robot using an interaction history architecture" Humanoid Robots, 2008, Humanoids 2008, 8th IEEE-RAS International Conference on, IEEE, Piscataway, NJ, USA, Dec. 1, 2008, pp. 609-616.
Peula J M et al :"Pure Reactive behavior learning using Case Based Reasoning for a vision based 4-legged robot", Robotics and Autonomous Systems, Elsevier Science Publishers, Amsterdam, NL, vol. 57, No. 6-7, Jun. 30, 2009, pp. 688-699.

* cited by examiner

*Primary Examiner* — Carlos Ortiz Rodriguez
(74) *Attorney, Agent, or Firm* — Mark M. Friedman

(57) ABSTRACT

A controller and corresponding method for operating a machine maintains a historical database including at least one sequence of parameters relating to the operating environment, corresponding actions taken, and corresponding outcomes of operation of the machine. The controller searches the database for episodes satisfying relevance criteria relative to a current sequence of parameters and then performs a randomized selection between two or more options, at least one of which is derived from similar episodes from the database. At least one control signal is then output to the machine indicating an action to be performed as determined based on the selected option.

26 Claims, 6 Drawing Sheets

FIG. 2A

| INDEX | INPUT | ACTION | SCORE |
|---|---|---|---|
| 1 | A | X | 0 |
| 2 | B | X | 1 |
| 3 | A | Y | 2 |
| 4 | C | Z | 0 |
| 5 | A | Y | 1 |

FIG. 2B

| INDEX | TYPE | VALUE |
|---|---|---|
| 1 | INPUT | A |
| 2 | INPUT | B |
| 3 | ACTION | X |
| 4 | INPUT | A |
| 5 | SCORE | 0 |
| 6 | ACTION | Y |
| 7 | INPUT | A |
| 8 | SCORE | 2 |

CONTROLLER WITH ARTIFICIAL INTELLIGENCE BASED ON SELECTION FROM EPISODIC MEMORY AND CORRESPONDING METHODS

FIELD AND BACKGROUND OF THE INVENTION

The present invention relates to controllers employing artificial intelligence and, in particular, it concerns a controller with artificial intelligence based on selection from stored episodic memory and corresponding methods.

Much emphasis has been put on how to codify "experience" of an artificial intelligence engine into some sort of codified decision-making structure, whether based on neural networks, rules or decision trees. Attempts are made to improve the codified structure based on experience. At any given time, the decision-making structure typically generates a unique output for a given input according to whatever is considered "optimum" for the current state of the decision-making structure.

SUMMARY OF THE INVENTION

The present invention is a controller with artificial intelligence based on selection from stored episodic memory and corresponding methods.

According to an embodiment of the present invention there is provided, a controller for controlling operation of a machine operating in an operating environment, the machine being responsive to control signals to perform a plurality of actions, the controller receiving signals indicative of parameters relating to the operating environment and sufficient to determine an outcome of operation of the machine, the controller comprising: (a) at least one output for providing control signals to the machine to perform selected actions; (b) at least one input for receiving signals indicative of parameters relating to the operating environment; (c) a data storage device containing a historical database including at least one sequence of parameters relating to the operating environment, corresponding actions taken, and corresponding outcomes of operation of the machine; and (d) a processing system including at least one processor, the processing system being in data communication with the data storage device, the at least one output and the at least one input, the processing system being configured to: (i) search within the historical database for similar episodes within the at least one sequence of parameters which satisfy relevance criteria relative to a current sequence of parameters; (ii) perform a randomized selection between a plurality of options, at least one of the options being derived from one of the similar episodes that had a favorable outcome of operation of the machine; and (iii) outputting at least one control signal to the machine via the output to perform a selected action, the control signal being determined as a function of a selected one of the options.

There is also provided, according to an embodiment of the present invention, a method for selecting at least one future action to be performed by a machine, the method comprising the steps of (a) providing a historical database including at least one sequence of parameters relating to the operating environment, corresponding actions taken, and corresponding outcomes of operation of the machine; (b) searching within the historical database for similar episodes within the at least one sequence of parameters which satisfy relevance criteria relative to a current sequence of parameters; (c) performing a randomized selection between a plurality of options, at least one of the options being derived from one of the similar episodes that had a favorable outcome of operation of the machine; and (d) outputting to the machine at least one control signal indicative of at least one action to be performed, the at least one action being determined as a function of a selected one of the options.

According to a further feature of an embodiment of the present invention, the randomized selection is weighted towards selection of a similar episode with a most favorable outcome.

According to a further feature of an embodiment of the present invention, the randomized selection is performed between a plurality of options including a random action option.

According to a further feature of an embodiment of the present invention, at least part of the historical database is provided as a pre-stored database containing a simulated history.

According to a further feature of an embodiment of the present invention, the historical database is updated with recent sequences of parameters relating to the operating environment, corresponding actions taken, and corresponding outcomes of operation of the machine.

According to a further feature of an embodiment of the present invention: (a) a list of episodes is maintained which satisfy the relevance criteria relative to a current sequence of parameters; (b) after receipt of new inputs, the relevance criteria are reevaluated relative to the updated current sequence of parameters and discarding episodes no longer satisfying the relevance criteria; and (c) a search of the historical database is performed intermittently to identify additional episodes of sequences of parameters satisfying the relevance criteria relative to the updated current sequence of parameters for inclusion in the list, wherein the randomized selection is performed using options derived from episodes in the list.

According to a further feature of an embodiment of the present invention, the controlled machine is an additional artificial intelligence controller operating according to a number of operating parameters, and wherein the outputs include a control signal for changing a value of at least one of the operating parameters of the additional artificial intelligence controller.

According to a further feature of an embodiment of the present invention, the searching and the randomized selection are performed according to settings defined by at least one operating parameter, and wherein a value of the at least one operating parameter is changed in response to an input received from an additional artificial intelligence controller.

According to a further feature of an embodiment of the present invention, the parameters relating to the operating environment are sensed, at least in part, by a set of sensors deployed for sensing parameters relating to the operating environment of the machine.

According to a further feature of an embodiment of the present invention, the set of sensors includes a range sensor deployed for sensing a distance from at least part of the machine to an object in the operating environment.

According to a further feature of an embodiment of the present invention, the set of sensors includes an imaging sensor, and wherein the processor system is further configured to perform image processing on imaged sampled by the imaging sensor to derive parameters relating to the operating environment.

According to a further feature of an embodiment of the present invention, the set of sensors includes an audio input, and wherein the processor system is further configured to perform sound processing on signals sampled by the audio input.

According to a further feature of an embodiment of the present invention, the machine is a virtual machine operating in a computer-generated virtual environment.

There is also provided according to an embodiment of the present invention, a controller for controlling operation of a machine operating in an operating environment, the machine being responsive to control signals to perform a plurality of actions, the controller receiving signals indicative of parameters relating to the operating environment and sufficient to determine an outcome of operation of the machine, the controller comprising: (a) a data storage device; (b) at least one output for providing control signals to the machine to perform selected actions; (c) at least one input for receiving signals indicative of parameters relating to the operating environment; and (d) a processing system including at least one processor, the processing system being in data communication with the data storage device, the at least one output and the at least one input, the processing system being configured to: (i) process a current sequence of parameters together with data from the data storage device to determine a plurality of options satisfying a desirability criterion; (ii) perform a randomized selection between the plurality of options; and (iii) outputting at least one control signal to the machine via the output to perform a selected action, the control signal being determined as a function of a selected one of the options.

There is also provided according to an embodiment of the present invention, a method for selecting at least one future action to be performed by a machine, the method comprising the steps of: (a) processing a current sequence of parameters together with data from the data storage device to determine a plurality of options satisfying a desirability criterion; (b) performing a randomized selection between the plurality of options; and (c) outputting to the machine at least one control signal indicative of at least one action to be performed, the at least one action being determined as a function of a selected one of the options.

BRIEF DESCRIPTION OF THE DRAWINGS

The invention is herein described, by way of example only, with reference to the accompanying drawings, wherein:

FIGS. 2A and 2B are two tables representing alternative exemplary data structures for a database of episodic history from the controller of FIG. 1;

DESCRIPTION OF THE PREFERRED EMBODIMENTS

The present invention is a controller with artificial intelligence based on selection from stored episodic memory and corresponding methods.

The principles and operation of controllers and corresponding methods according to the present invention may be better understood with reference to the drawings and the accompanying description.

Overview of Structure and Operating Principles

Figure 1:
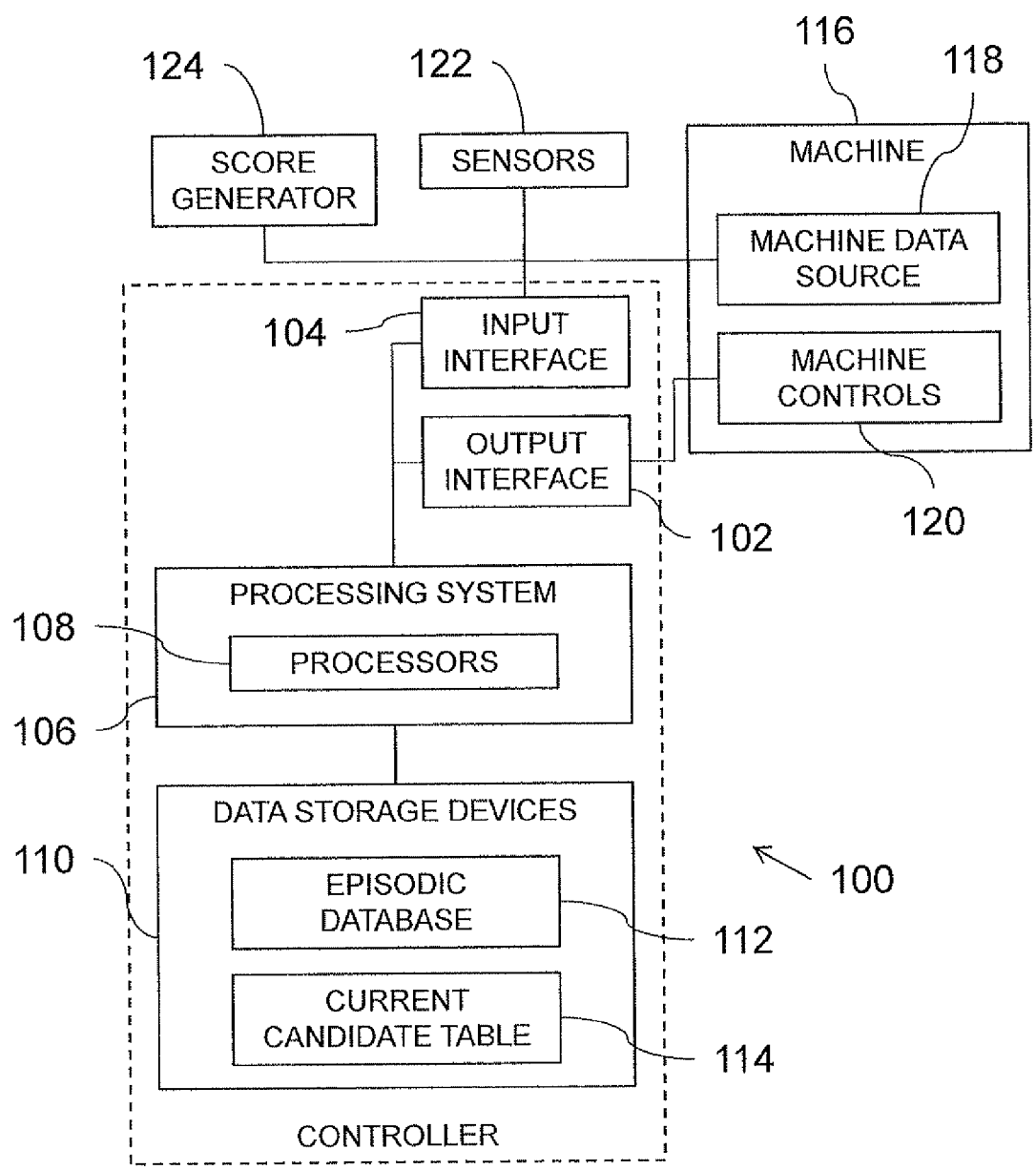
FIG. 1 is a block diagram of an embodiment of controller, constructed and operative according to the teachings of the present invention, for controlling a machine.

Referring now to the drawings, FIG. 1 shows a schematic block diagram representation of a controller, generally designated 100, constructed and operative according to an embodiment of the present invention, for controlling a machine 116.

In the embodiment illustrated here, controller 100 includes at least one data storage device 110, at least one output 102 for providing control signals to machine 116 to perform selected actions, and at least one input 104 for receiving signals indicative of parameters relating to the operating environment of machine 116. The input signals may originate from a data source 118 within the machine itself, or may be from independent sensors 122 or any other source. The input signals are chosen to be sufficient to determine an outcome of operation of the machine, preferably in the form of one or more "score" parameters. The score may either be derived by controller 100 based on other input parameters, or may be provided from a dedicated external "score generator" 124, which may optionally include a human teacher.

Controller 100 further includes a processing system 106, including at least one processor 108, that is configured to:

maintain within data storage device 110 a historical database 112 including at least one sequence of parameters relating to the operating environment, corresponding actions taken, and corresponding outcomes of operation of the machine;

search within the historical database 112 for similar episodes within the sequence of parameters which satisfy relevance criteria relative to a current sequence of parameters;

perform a randomized selection between a plurality of options, at least one of the options being derived from one of the similar episodes that had a favorable outcome of operation of the machine; and output at least one control signal to the machine via the output to perform a selected action, the control signal being determined as a function of a selected one of the options.

Processing system 106 may be implemented using a general purpose computer, modified where necessary to provide appropriate inputs and outputs for the particular application, and operating under control of suitable software that configures the computer to perform the various tasks as defined herein. Code embodied in a computer-readable medium which, when executed on a general purpose computer, is effective to configure the computer to perform the recited steps, also constitutes an aspect of the present invention. The required software may be built around the various processing steps described herein and, being self-explanatory to a person having ordinary skill in the art, will not be described here in detail. Clearly, implementations employing dedicated hardware, or hardware-software combinations referred to as firmware, also fall within the scope of the present invention.

According to one particularly preferred but non-limiting optional implementation, a current set of candidate historical episodes upon which decisions about actions to be taken are based may be stored and managed within a table 114, to be described in more detail below.

Thus, certain embodiments of the invention may be distinguished from various existing approaches to artificial intelligence in that, rather than codifying a decision-making structure, they maintain an episodic historical record of past experience, allowing the controller to "remember" what worked in the past in similar situations and to build on that past experience. According to an embodiment of the present invention, a history of all events that happened during the current run, and optionally also in previous runs, is maintained, although it may optionally be manipulated or pruned. This history is used to select the actions to be considered as options for any new situation. No explicit knowledge-base, function, or set or rules is required, although some pre-loaded history may be provided to shorten learning times where appropriate.

Certain embodiments of the invention may additionally, or alternatively, be distinguished from various existing approaches to artificial intelligence in that, rather than consistently selecting a single option considered the "best" according to the current state of the system, they perform a randomized selection which is weighted towards an option identified as the "best" option, but will also sometimes select either another option considered "good", or will experiment with introduction of a randomly (or pseudo-randomly) chosen action. The use of randomized selection renders the controller more human-like in its behavior, and provides adaptability to new situations and changing environments by periodically trying different or new approaches to similar situations.

DEFINITIONS

In this context, "history" or "historical" is used to refer to a record of past events, including inputs, actions taken and scores achieved. The history may be entirely real or may be a simulated history including transplanted "experience" from another controller, and/or a specially manufactured history, to provide a baseline of experience from the start of use. In a simple implementation, the historical database is assumed to be a complete record of the history of the controller, but in practical implementations, it may be pruned in order to reduce data storage requirements and to decrease search time. Pruning can be performed on the basis of discarding the oldest data (particularly suitable for rapidly changing environments), or on the basis of other criteria such as discarding historical episodes which resulted in mediocre desirability of the outcomes, i.e., that are not particularly useful either for re-use or for avoiding past mistakes.

The "events" recorded in the database may be raw input data (such as parameters measured by sensors) or derived data obtained by processing various inputs. Actions taken and outcomes of those actions are preferably also stored as part of the historical database. In some cases, the actions and outcomes are matched up neatly with input data, allowing use of a data structure such as that illustrated in FIG. 2A. In other cases, the order may be more chaotic, for example, with scores being provided out-of-sync with the actions, and/or without a one-to-one relationship to the actions. In such cases, a data structure such as that of FIG. 2B is more suitable. In each case, actions and scores appearing during the same period or "episode" as the inputs, or likely to be causally related to the inputs, possibly with a given degree of delay, are referred to as "corresponding" actions and scores.

The term "episode" or "episodic" is used to refer to a time sequence selected from the historical database which can be compared to a current sequence of events to determine its relevance and desirability for the purpose of deciding whether to re-use the sequence for choosing upcoming action(s). An episode is typically identified by a pointer to a location within the historical database which indicates a point in the prior history potentially paralleling the current parameters of the input sequence. A database is referred to as "episodic" if it stores one or more historical sequences rather than just statistical summaries of the data. The database preferably also has a data structure arranged in a manner which facilitates searching and/or retrieval of episodic data, typically from an arbitrary location within the database. In some cases, the historical information may be pruned or otherwise selectively reduced. However, the information is still considered "episodic" so long as there remain a plurality of episodes which are comparable to at least a proportion of the possible input sequences, leaving a decision-making choice to be made by the controller rather than a single-value-output rule.

Reference is made herein to implementations of the present invention as a "controller" for a "machine". The term "machine" here includes a wide range of physical and virtual machines which may be operated under the control of an artificial intelligence engine or "controller". Examples of relevant machines include, but are not limited to, robotic vehicles (submersible, waterborne, land vehicles, airborne and space vehicles), other robotic systems, natural language interaction systems with speech and/or text interfaces, simulators for training people to perform various tasks, and virtual machines or characters operating in virtual environments such as for computer games. A number of specific examples will be described in more detail below.

The "controller" is implemented in various different forms suited to the given application. In cases of robotic devices, the controller may be either implemented as an external controller or may be integrated onto the machine platform. In the case of a virtual machine, the controller is typically implemented as a suitable program module or other virtual object, as is known in the art.

Similarly, the nature of the "operating environment" varies according to the type of application. In a robotic vehicle application, the operating environment typically relates to the physical environment immediately around the machine, and may extend to wide-area information such as geographic position (GPS) and navigation data such as pre-loaded maps. In a speech recognition machine, the environment relates primarily to the sound at the input (microphone) locations. In a virtual-world application, the environment is typically the machine generated environment possibly as modified by other independent computer-operated machines or characters and any human-operated characters.

The term "actions" refers to the entire range of available actions that can be performed by the machine. The available set of actions may vary over time, or as a result of events or previous actions.

The outcomes of operation of the machine is preferably quantified in the form of one or more designated score inputs. The scores reflect an underlying system of evaluation according to which progress towards one or more goals, and/or adherence to one or more principles, can be assessed. Scores may be objectively defined, or may be provided from a subjective source, such as a human observer. Furthermore, a scoring system may vary over time as a situation changes. A score may be a simple number indicating an overall assessment of the outcome, or may have a number of separate components, for example, indicative of progress towards low-level and high-level goals, or short-term and long-term goals. Where different score components are used, they may be represented as a multi-dimensional vector, or may be handled as separate events occurring in the history sequence.

Reference is made to a "current sequence of parameters" which refers to the sequence of parameters or events leading up to the most recent inputs, and possibly including some degree of look-ahead prediction. The current sequence of parameters is compared against episodes from the historical database to identify similar sequences.

The term "similarity", when used to refer to an individual pair of events, refers to a function which determines a degree of similarity between the events. In certain cases, a simple test of equivalence may be used for discrete variables, or a threshold for continuous variables. However, in many cases, a more complex function may be needed to assess the degree of similarity between a measured parameter in the current sequence and a historical parameter. In some cases, data may be classified as different data types, and different similarity functions may be applied to the different types of data.

The term "relevance" or "relevance criteria" is used to refer to an overall measure of similarity between the current sequence and a historical episode. A basic form of this measure can be a weighted sum of the similarity of pairs of events. In an alternative non-limiting example, for each event, the similarity entered into the calculation may be the similarity of the most similar event in the historical sequence, even if displaced by up to N positions. In the case of N=0, the latter approach simplifies to the former direct comparison of successive pairs of parameters. Differing weights may be assigned for different types of data. In some cases, weights for comparison of actions and scores may be very low or zero, leading to selection of relevant historical episodes based on the operating environment only, while in others, the actions and/or the scores may also play a significant role in the assessment of relevance.

The term "desirability" is used to refer to an overall measure of the expected score over time if following a path of action modeled on a given historical episode, projecting ahead to the future expected scores. The most "desirable" option is thus not necessarily the option which generates the highest short term score, but may instead be the one that will lead to slightly lower scores that are likely to be maintained over time. An option is considered to have a "favorable outcome" if the desirability value satisfies given criteria, such as if the desirability of the given option is one of a number of best-available options from within a group of options being considered, or other criteria defined in comparative or absolute terms. "Most favorable" refers to an option with the highest desirability value from the group of options being considered.

Finally with regard to definitions, reference is made to "randomized selection". In this context, randomized selection refers to any selection which may generate either of at least two results for the same given situation. The randomized selection of embodiments of the present invention is typically performed after a number of options have been sorted by desirability, and is implemented in such a way as to give an increased probability to selection of the most desirable option, and successively decreasing probability to each successively less desirable option. The term "random" is used here loosely to refer to a decision making process which is unpredictable, but does not require that the process is truly random. In certain embodiments, the set of available options in the randomized selection includes a "random action", i.e., randomly selected from a group of available actions not because of any pre-rated desirable result. The random action is preferably allotted a relatively low probability, making it an infrequently chosen path of action. Nevertheless, the occasional use of an unexpected action builds into operation of the controller a degree of adaptability to find new or better solutions to previously encountered situations. Even in the case of a random action, various actions correlated to particularly undesirable outcomes are preferably excluded from the range of options.

Overview of Typical Operation

Figure 3:
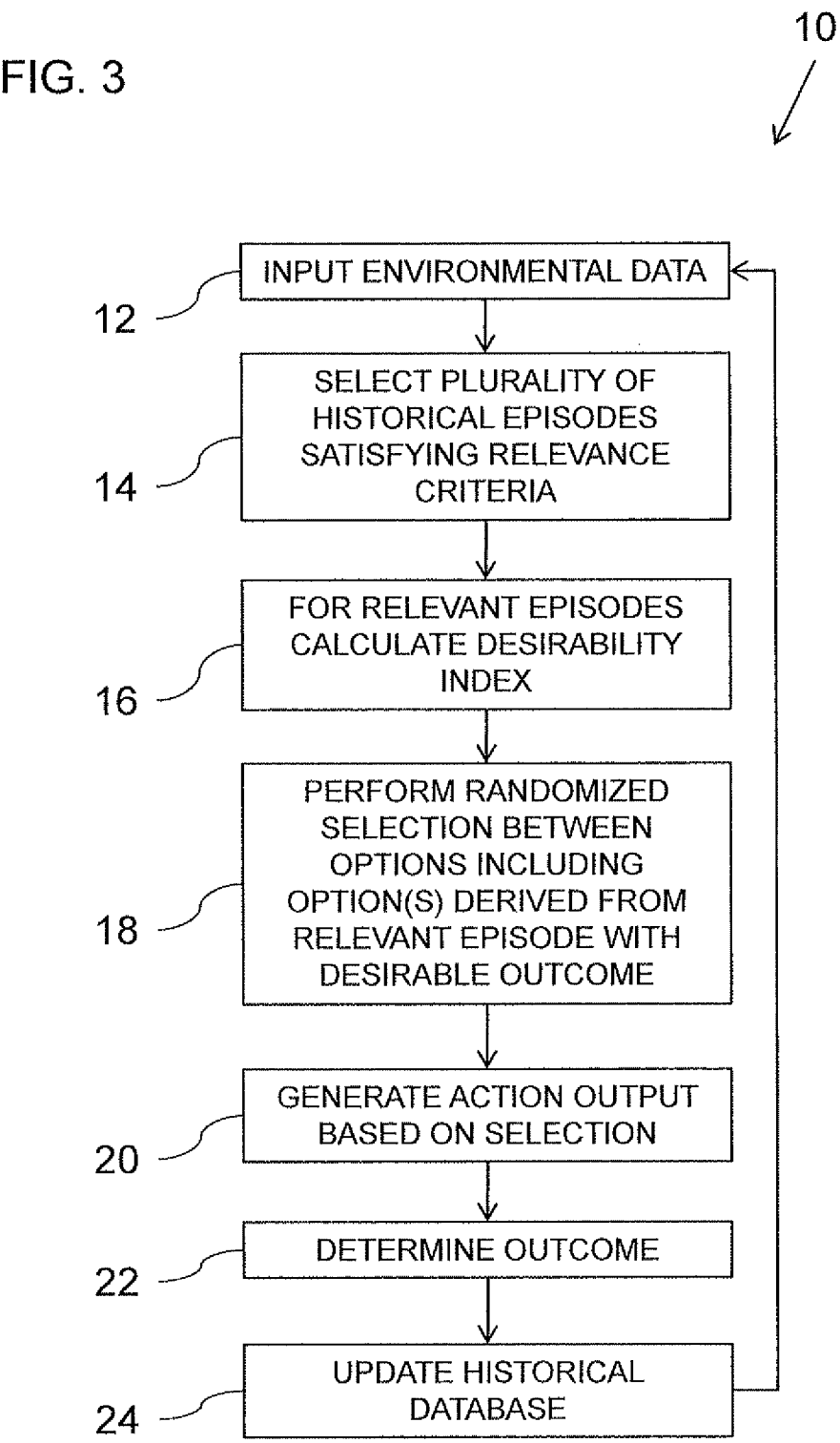
FIG. 3 is a high level flow diagram illustrating operation of a controller according to an embodiment of the present invention.
Figure 4:
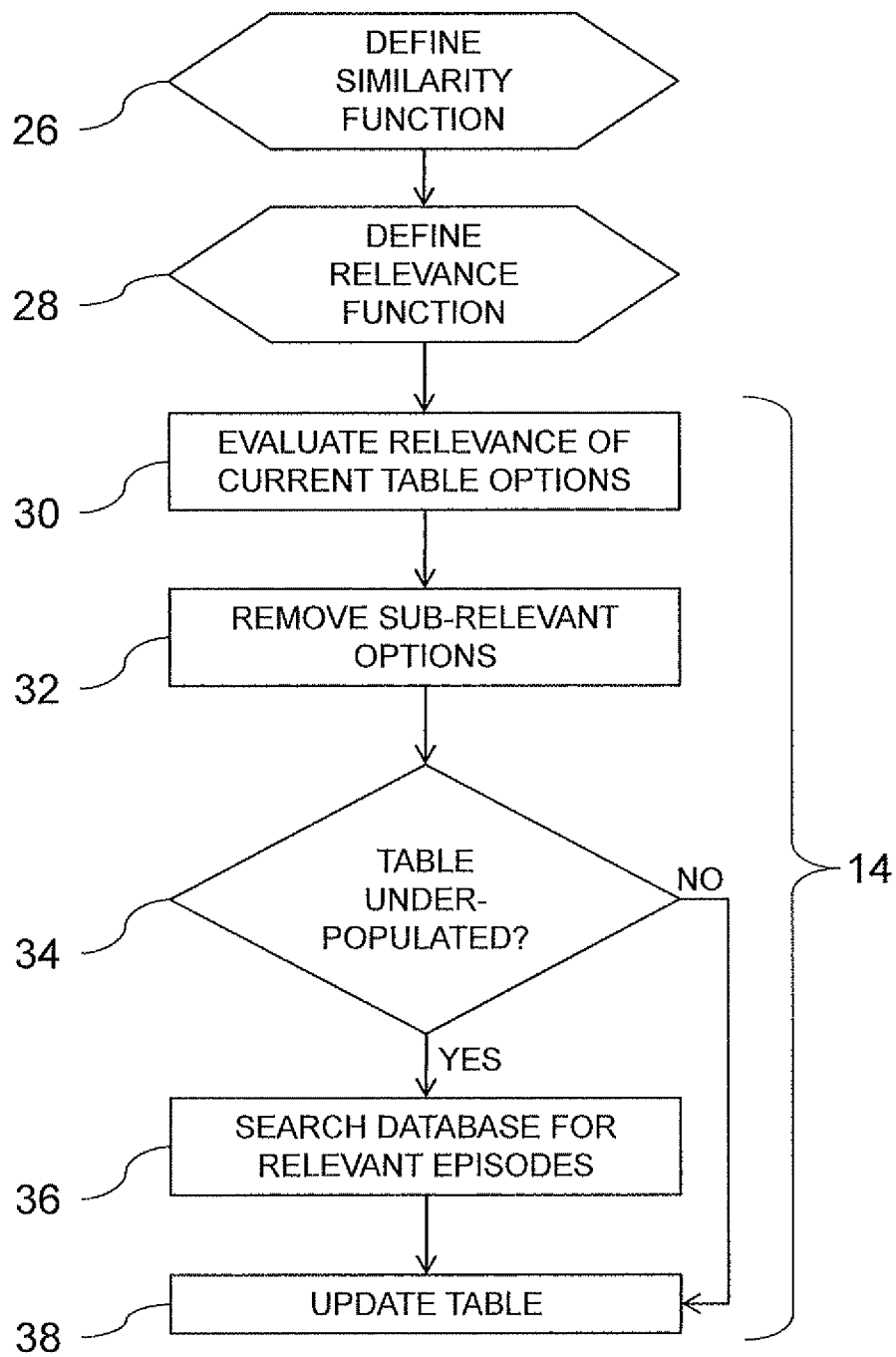
FIG. 4 is a more detailed flow diagram including an expansion of block 14 from the flow diagram of FIG. 3 according to an embodiment of the present invention.
Figure 5:
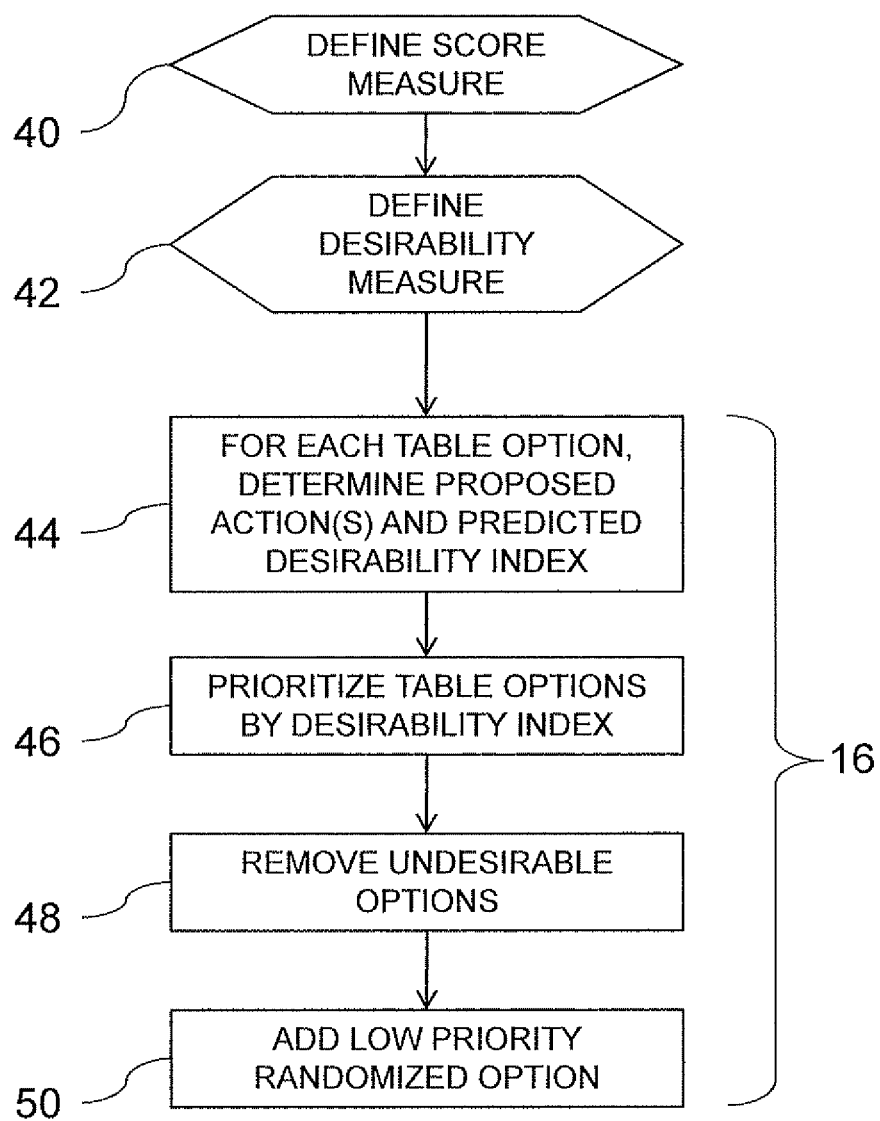
FIG. 5 is a more detailed flow diagram including an expansion of block 16 from the flow diagram of FIG. 3 according to an embodiment of the present invention.

Turning now to FIGS. 3-5, these illustrate the overall flow of operation of controller 100 according to a typical implementation, corresponding to a method according to an embodiment of the present invention. Referring first to FIG. 3, a cycle of operation may be considered to begin with input of some data relating to the operating environment (step 12) which, together with previously sampled data, generates an updated current sequence of parameters. A plurality of historical episodes satisfying some relevance criteria are selected (step 14), either directly from the historical database or from a table of candidate options, as will be described in more detail below, and the desirability of choosing a next action according to each of the episodes is calculated (step 16). Randomized selection is then performed (step 18) between one or more options derived from relevant episodes with a desirable outcome, optionally together with a random action option. An action output is then generated (step 20) to actuate the machine to perform the selected action. Score data indicative of the outcome of operation of the machine is then input or determined (step 22), and the historical database is updated (step 24). In the "disorderly" data flow scenario of FIG. 2B, all steps of FIG. 3 occur generally in parallel according to the dynamics of the data flow.

FIG. 4 illustrates in more detail a preferred but non-limiting implementation of selection of relevant historical episodes (step 14) based on maintaining a table 114 of candidate options. Firstly, as mentioned earlier, assessment of relevance is preferably facilitated by defining one or more similarity functions between individual pairs of data entries (step 26), and an overall relevance function which combines the individual similarity functions to assess similarity of an sequence of entries (step 28). The specific exemplary implementation of step 14 then proceeds as follows. At step 30, the relevance of the current list of options in the table is reevaluated and/or updated based upon the most recently received data, and table entries whose level of relevance has fallen below a certain threshold value are dropped from the table (step 32). Then, at step 34, if the removal of less relevant entries from the table has depleted the table below a desired number of entries, a search is performed in historical database 112 to find existing new candidate episodes which have a sufficient level of relevance to the current sequence of parameters to repopulate the table (step 36) and the table is updated accordingly.

Parenthetically, it should be noted that the sequence illustrated here is appropriate for "normal" operation, but may not always be possible to implement exactly in this form. For example, in the case of a new device starting operation with no previously stored history, the history will initially not contain any matches to the current situation, and random actions will be taken until the device has accumulated sufficient relevant "experience" in the historical database.

It will be noted that the management of candidate entries in a table in this manner greatly reduces the search burden of implementing the present invention, reducing the full database search to an intermittent operation required only when the selection table has become too sparsely populated.

Turning now to FIG. 5, this illustrates in more detail a preferred but non-limiting implementation of sorting candidate options according to desirability (step 16), again employing the table 114 of candidate options. Here too, as mentioned earlier, assessment of desirability is facilitated by defining one or more score measures (step 40) and an overall measure of desirability (step 42). The notion of similarity is central to these algorithms. In the simplest examples, if two objects are identical they are considered similar, otherwise not. However, the similarity function can also be any of the following:
- A linear vector of weights for comparing vectorial inputs,
- A neural-network,
- Any other system.

These similarity functions may require tuning/training for every particular application. This can be achieved using genetic algorithms, back-propagation of error, another instance of a controller according to the teachings of the present invention, or any other method. The tuning allows the similarity function to give appropriate weight to the various data of varying importance.

Similarly, any or all of the other operating parameters controlling the algorithm may be tuned using whatever manual or automatic techniques are appropriate to the intended application.

The specific non-limiting exemplary implementation of step 16 then proceeds as follows. Firstly, for each table option, the corresponding proposed next action and the predicted desirability index is calculated (step 44), and the table is sorted according to the desirability index (step 46). Preferably, any options with undesirable predicted outcomes are removed from the decision making options, and preferably from the entire table (step 48). According to certain preferred embodiments, as mentioned above, a low priority randomized option is added as a possible action (step 50) in order to provide for occasional unpredictable or experimental behavior. The process then proceeds with the randomized selection at step 18 of FIG. 3.

Example

To illustrate operation of the AI controller of the present invention according to an exemplary non-limiting embodiment, we present a simple experiment according to which the AI controller is taught to differentiate between words and non-word (N-W) sequences of three letters (of the letters: 'D', 'G', 'O'). There are four words made from these letters: 'DOG', 'GOD', 'GOO', 'ODD'.

At each turn the AI is given a letter and it should output if the last three letters form a valid word. If it is correct it is given a score of one, else it is given a score of zero.

Recent history is shown in Table 1:

TABLE 1

| 897 Input | Action | Score | 898 Input | Action | Score | 899 Input | Action | Score | 900 Input | Action | Score |
|---|---|---|---|---|---|---|---|---|---|---|---|
| 'O' | WORD | 1 | 'G' | N-W | 1 | 'O' | N-W | 1 | 'O' | WORD | 1 |

At turn 900 the input is 'O', and the table looks as shown below in Table 2. Note that the events shown are (the beginning of) the predicted future, from which the desirability is extracted. The columns in which we would have seen 'G' 'O' are "to the left" (not shown)—the leftmost column in the table is the one which currently corresponds to the input in iteration No. 900.

TABLE 2

| Index | Relevance | Input | Action | Score | Input | Action | Score |
|---|---|---|---|---|---|---|---|
| 1 | 0.4 | 'D' | WORD | 1 | 'O' | N-W | 1 |
| 2 | 1.3 | 'O' | WORD | 1 | 'G' | N-W | 1 |
| 3 | 1.3 | 'O' | WORD | 1 | 'G' | N-W | 1 |

TABLE 2-continued

| Index | Relevance | Input | Action | Score | Input | Action | Score |
|---|---|---|---|---|---|---|---|
| 4 | 0.4 | 'D' | WORD | 1 | 'G' | N-W | 1 |
| 5 | 0.4 | 'D' | WORD | 1 | 'G' | N-W | 1 |
| 6 | 0.4 | 'D' | WORD | 1 | 'G' | N-W | 1 |
| 7 | 0.96 | 'O' | WORD | 1 | 'O' | N-W | 1 |
| 8 | 1.6 | 'O' | WORD | 1 | 'O' | N-W | 1 |
| 9 | 1.6 | 'O' | N-W | 0 | 'G' | WORD | 0 |
| 10 | 1.37 | 'O' | N-W | 0 | 'D' | N-W | 1 |
| 11 | 1.6 | 'O' | N-W | 0 | 'G' | N-W | 1 |
| 12 | 1.6 | 'O' | N-W | 0 | 'G' | N-W | 1 |
| 13 | 1.3 | 'O' | WORD | 1 | 'O' | N-W | 1 |
| 14 | 1.07 | 'O' | N-W | 1 | 'D' | WORD | 0 |
| 15 | 1 | 'O' | N-W | 1 | 'O' | WORD | 1 |
| 16 | 1.13 | 'O' | N-W | 1 | 'G' | N-W | 0 |
| 17 | 1.06 | 'O' | N-W | 1 | 'D' | WORD | 1 |
| 18 | 0.85 | 'O' | N-W | 1 | 'D' | WORD | 0 |
| 19 | 1.08 | 'O' | N-W | 1 | 'D' | WORD | 0 |
| 20 | 0.56 | 'O' | N-W | 1 | 'D' | WORD | 0 |

After sorting for relevance and taking the top 8 we are left with a list of relevant options shown in Table 3:

TABLE 3

| 8 | 1.6 | 'O' | WORD | 1 | 'O' | N-W | 1 |
|---|---|---|---|---|---|---|---|
| 9 | 1.6 | 'O' | N-W | 0 | 'G' | WORD | 0 |
| 11 | 1.6 | 'O' | N-W | 0 | 'G' | N-W | 1 |
| 12 | 1.6 | 'O' | N-W | 0 | 'G' | N-W | 1 |
| 10 | 1.37 | 'O' | N-W | 0 | 'D' | N-W | 1 |
| 2 | 1.3 | 'O' | WORD | 1 | 'G' | N-W | 1 |
| 3 | 1.3 | 'O' | WORD | 1 | 'G' | N-W | 1 |
| 13 | 1.3 | 'O' | WORD | 1 | 'O' | N-W | 1 |

After sorting by desirability and taking the top four we have prioritized preferred options as shown in Table 4:

TABLE 4

| 8 | 1.6 | 'O' | WORD | 1 | 'O' | N-W | 1 |
|---|---|---|---|---|---|---|---|
| 2 | 1.3 | 'O' | WORD | 1 | 'G' | N-W | 1 |
| 3 | 1.3 | 'O' | WORD | 1 | 'G' | N-W | 1 |
| 13 | 1.3 | 'O' | WORD | 1 | 'O' | N-W | 1 |

The probabilistic chooser chose the first line, "8", and the chosen action was WORD.

The score for that was 1, because 'GOO' is a word.

Figure 6:
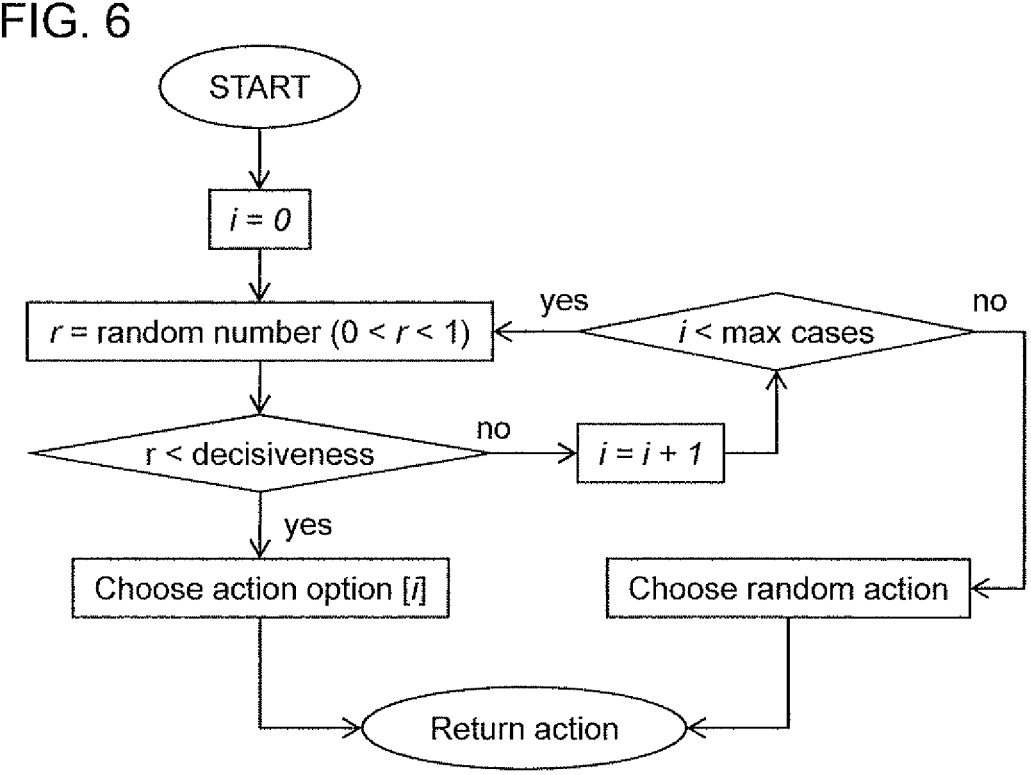
FIG. 6 is a flow diagram illustrating an implementation of a probabilistic chooser for use in the randomized selection of block 18 of FIG. 3.

The randomized selection can be performed in many ways. By way of one non-limiting example, FIG. 6 illustrates an implementation of a "probabilistic chooser" algorithm which selects items numbered 0, 1, 2 etc. from a table of prioritized options, with a probability defined by a parameter [decisiveness] (e.g., 0.7) of selecting the first option, [decisiveness]^2 of selecting the second option etc. until it has considered a number of options set by parameter [max cases]. When it reaches the limit without having selected an action, a random action is chosen (subject to optional exclusion of any unacceptable options).

Both operating parameters [decisiveness] and [max cases] may vary over time and/or according to any other algorithm. For example, during the early stages of training of the controller, when historical accumulated data is insufficient to provide a strong basis for decisions, the probabilistic chooser may be biased more towards exploratory random actions by employing relatively low values for either or both of these parameters. When the controller is well trained through extensive experience, relatively higher values for one or both parameters may be more appropriate, giving a stronger bias towards the solutions that have worked well in the past while maintaining a smaller (but typically non-zero) probability of selecting an exploratory random action. In certain applications, particularly where experimental behavior could be damaging or dangerous, the options for exploratory random actions may be subject to limitation rules or entirely excluded.

Optional Features, Refinements and Variants

Panic mode is based on the observation that people won't choose an option that is much worse than the others. So the algorithm won't choose the worst option harvested from the table, based on the (immediate, or averaged) reward signal.

Although the decision making process described above as a multi-stage process in which a table is populated and maintained, sorted according to "relevance" of the options and then a choice is made according to "desirability", it should be noted that this subdivision is not essential. For example, the relevance may also play a role in the choosing process.

As mentioned above, the AI can be seeded by loading a previously saved history into the history table. The seeded history makes the beginning of the history, and new events are appended to it. This enables carrying knowledge forward from one run to another. It also enables us to seed the AI with human created or procedure created "fore-knowledge".

The Algorithm's learning function can also be turned off, so that the "seeded" knowledge becomes the only usable knowledge—this is useful is application where we don't want the machine to "learn new tricks" in the field, as it may be too dangerous. A pre-loaded set of memories would contain all necessary knowledge for the task-range that the machine would likely encounter.

Fading/pruning memories, creating/concentrating concepts: memories that are not used for a long time can be eliminated, not only for saving on memory space, but mainly for run-time economies. Therefore, the frequency in which memories are used may be monitored. The frequently-used memories become in a sense less a log of a specific event but more a prototypical example that is used as a concept or a habit.

The importance of a memory can be based on its frequency of usage (as above) or on the sequence's importance in terms of getting the algorithm "out of trouble" (the improvement achieved over a period of time).

Use of Multiple Controllers—"Federating"

Using more than one engine to deal with a situation allows for different engines to handle different aspects, when these are conceptually separable. Optionally, it allows for one engine to control the others so as to achieve a complex task. Federating can be implemented in a number of different ways.

Federating hierarchically: engines can be arranged in a hierarchy in the following ways:

A subordinated engine can also decide as an action to pass some input to a superior engine, thereby alerting the "planner" if something out-of-the-ordinary happens during the execution of a plan. "Upward" communication can also allow the lower engine to parse or otherwise recognize the details, and pass up its understanding of the details, like in a system for voice-recognition, natural language processing, and finally substantive response.

The control of the superior engines on the subordinated engines can be done by replacing the memories on which the controlled engine works, or by changing some circumstance in the controlled engine's inputs. The "superior engine" may also change any of the operating parameters of its subordinates, as an expression of its experience of what type of parameters would allow the lower engine of serve the overall purpose better.

Federating in time: different engines can act and calculate in different time magnitudes, for example, one controlling second-by-second, one minute-by-minute, one day-by-day, so that complex tasks can be accomplished.

Federating, all at the same level: each engine looks at a different part of a problem, in a distributed manner, or with some form of overall task coordination, whether based on this technology (hierarchy) or not.

Self modification: each instance to itself or one instance modifying the others, hierarchically or not:
 1. The algorithm for what is "similar" can vary;
 2. The algorithm for "choosing the best" and adding random action can vary;
 3. The policy as to what counts as "subsequently" can vary;
 4. Any setting or parameter can vary;
 5. The algorithm for calculating or using scores and/or desirability can change, effectively changing or refining what counts as "good".
 6. The same machine can have multiple algorithms of each of these categories above in it at the same time, and one of the actions available to it can be to switch between them; for instance, the machine may learn by experience that when something red appears nearby it is best to think short-term, while yellow things are better handled long-term.

Mixed "federations": some of the machines is a federation can be of a different technology, like Neural Networks, etc.

Other Variants

If the function to calculate the "desirability" from the score is constant, run-time efficiency may be improved by caching calculated desirability values previously calculated for a given event vis-à-vis similar events in history, thereby avoiding repetitious calculations.

A specific variation to the "relevance" algorithm could be to prefer more recent experiences. That would allow the machine to change its pattern of behavior and adapt to a changing environment. An opposite preference, for the old, would create a more fixed, perhaps neurotic, behavior. This parameter (the slope and shape of the "curve of preference" as a function of time) can also be subjected to the machine's own control.

More or less than one action can be computed in every iteration.

Although the decision making process has been described above in a particularly preferred implementation based upon use of a table containing a subset of available options considered relevant, it should be noted that alternative implementations may work without such a selection process, instead assigning a weight/relevance to many or all possible sequences. This allows all memories to play some part in the decision making process.

Example

Land Vehicle

An AI controller according to an embodiment of the present invention may be implemented for driving a vehicle, whether an airborne vehicle, land vehicle, waterborne craft or submergible. For the purpose of one non-limiting example, the controller may be part of a driving system for an automated driverless car or robot courier. For such an implementation, the inputs, outputs and scores may be defined as follows:

INPUTS may include and one or more of the following:
- distance to surrounding objects to front, sides, and/or rear of vehicle, determined, for example, by range sensors;
- speed as determined, for example, by a vehicle speedometer;
- compass bearing and/or GPS location as determined, for example, by a digital compass and/or GPS receiver;
- properties of the driving surface, determined, for example, by one or more on-board accelerometer to indicate bumpiness;
- route planning information;
- a rain sensor;
- a sensor for lighting conditions;
- a data source regarding speed limits;
- a camera with image processing, for example, for identifying street signs;
- vehicle warning indicators such as petrol level, engine temperature, oil/water warnings.

Optionally, various of the inputs can be provided by multi-layer processing of video (and/or audio) inputs. For example, a number of federated controllers, one or more of which operate according to the teachings of the present invention, may be used to:

a) perform image segmentation and/or object recognition to identify traffic signs, other vehicles;
b) perform simultaneous localization and mapping (SLAM) processing to derive vehicle motion and a 3D model of environment;
c) employ the 3D model for short-range navigation to avoid collisions; and
d) employ the 3D model together with GPS and/or compass data for correlation against a map for navigation to the target location.

No one type of input is crucial. For example, use of a video camera plus SLAM may replace distance sensors, or vice versa. In some applications, use of a LIDAR sensor may be advantageous.

For learning basic safe-driving practices, the AI controller can be trained in a virtual environment, or in a controlled real environment, or by transplantation of a suitable basic memory. Where a number of federated controllers are used, the prior training may be provided for all, or only a subset, of the controllers. For certain critical tasks, a "no more learning" option may be implemented in which that controller does not store any new info, and does not take random actions.

ACTIONS: these typically include:
- increase/decrease acceleration;
- increase/decrease braking;
- incremental steering to right/left;
- actuate/deactivate signals right/left;
- controlling steerable video sensors.

Where multiple federated controllers are used, some or all of the controllers may provide an "action" which is an output serving as an input, score or to update an operating parameter of another controller.

SCORE: This typically originates from one or more of two sources:
- "objective" scores come from approaching the destination (closing the distance) and avoiding collisions.
- "subjective" scores can be provided by a human instructor, just as a human being learns to drive.

For handling spatial relationships, polar coordinates are generally the preferred framework for an agent to view its environment. To further simplify processing, a group of objects can be pre-processed into a single entity of a "cluster" which has a characteristic of being, for example, 3, 5, 20-30, etc. members. This cluster is preferably presented to the AI engine as a single entity in the polar space.

Example

Natural Language Interaction

A natural language interaction system is a system which allows people to interact verbally with a computer system as if talking freely to another person. This may be used in a wide range of applications including, but not limited to: a computer input interface; an interactive information system; a customer service system; and a voice operated reservation system.

Typical inputs may include, depending on the level of analysis required, an audio input, such as a microphone or an input arrangement for receiving audio files or signals from a remote audio source (for voice recognition), letters or phonemes for word recognition, and words for the conversational level. Here too, these different levels may be federated between a hierarchy of AI controllers, one or more of which operate according to the teachings of the present invention, each operating on a different level and providing its output as the input to the next level. Clearly, many other inputs may be used according to the particular application. For example, in a customer-service system, additional inputs may be derived from a corporate database, customer records etc.

The actions of the system may be the recognized words, particularly for a computer input system, or may be the responses for a "customer service" type system.

The score is typically provided initially by human trainers, but may also employ "satisfaction indicators" derived from the content and/or tone of the customer's speech.

Example

Computer-Generated Character

The AI controller of the present invention may also be used to operate one or more character in a virtual world, typically for interacting directly with a human user, or with a character within a game that is controlled directly by a human user.

Inputs and outputs for such applications are defined within the framework of the virtual world. Training and scores may be provided by human trainers via suitable inputs, as a separate training process, or possibly during progression of the game.

It will be appreciated that the above descriptions are intended only to serve as examples, and that many other embodiments are possible within the scope of the present invention as defined in the appended claims.

What is claimed is:

1. A controller for controlling operation of a machine operating in an operating environment, the machine being responsive to control signals to perform a plurality of actions, the controller receiving signals indicative of parameters relating to the operating environment and sufficient to determine a score relating to an outcome of operation of the machine, the controller comprising:

(a) at least one output for providing control signals to the machine to perform selected actions;
(b) at least one input for receiving signals indicative of parameters relating to the operating environment;

(c) a data storage device containing a historical database including: at least one sequence of parameters relating to the operating environment; corresponding actions taken; and corresponding scores relating to outcomes of operation of the machine; and (d) a processing system including at least one processor, said processing system being in data communication with said data storage device, said at least one output and said at least one input, said processing system being configured to:

(i) maintaining a list of episodes, corresponding to sequences identified within the historical database, which satisfy a relevance criteria relative to a current sequence of parameters, said relevance criteria employing a relevance function corresponding to an overall measure of similarity between the current sequence of parameters and the episode derived by combining a plurality of similarity functions, values of said relevance function for each episode in said list being updated based on recently input parameters;

(ii) perform a randomized selection between a plurality of actions or sequences of actions, at least one of said actions or sequences of actions being derived from an episode in said list that had a favorable outcome of operation of the machine; and (iii) outputting at least one control signal to the machine via said at least one output to perform the selected action or sequence of actions.

2. The controller of claim 1, wherein said processing system is configured to perform said randomized selection wherein said randomized selection is weighted towards selection of a similar episode with a most favorable outcome.

3. The controller of claim 1, wherein said processing system is configured to perform said randomized selection between a plurality of actions or sequences of actions including a random action.

4. The controller of claim 1, wherein at least part of said historical database is provided as a pre-stored database containing a simulated history.

5. The controller of claim 1, wherein said processing system is further configured to update said historical database with: recent sequences of parameters relating to the operating environment; corresponding actions taken; and corresponding outcomes of operation of the machine.

6. The controller of claim 1, wherein said processing system is further configured to:

(a) after receipt of new inputs, reevaluate said relevance criteria relative to an updated current sequence of parameters and discard episodes no longer satisfying said relevance criteria; and (c) intermittently perform a search of said historical database to identify additional episodes satisfying said relevance criteria relative to the updated current sequence of parameters for inclusion in said list.

7. The controller of claim 1, wherein the controlled machine is an additional artificial intelligence controller operating according to a number of operating parameters, and wherein said outputs include a control signal for changing a value of at least one of said operating parameters of said additional artificial intelligence controller.

8. The controller of claim 1, wherein said processing system performs said maintaining a list and said randomized selection according to settings defined by at least one operating parameter, and wherein said processing system is responsive to an input received from an additional artificial intelligence controller to change a value of said at least one operating parameter.

9. The controller of claim 1, further comprising a set of sensors associated with said at least one input and deployed for sensing parameters relating to the operating environment of the machine.

10. The controller of claim 9, wherein said set of sensors includes a range sensor deployed for sensing a distance from at least part of the machine to an object in the operating environment.

11. The controller of claim 9, wherein said set of sensors includes an imaging sensor, and wherein said processing system is further configured to perform image processing on images sampled by said imaging sensor to derive parameters relating to the operating environment.

12. The controller of claim 9, wherein said set of sensors includes an audio input, and wherein said processor system is further configured to perform sound processing on signals sampled by said audio input.

13. The controller of claim 1, wherein the machine is a virtual machine operating in a computer-generated virtual environment.

14. A method for selecting at least one future action to be performed by a machine, the method receiving as an input signals indicative of parameters relating to an operating environment of the machine and sufficient to determine a score relating to an outcome of operation of the machine, the method comprising the steps of (a) providing a historical database including: at least one sequence of parameters relating to the operating environment; corresponding actions taken; and corresponding scores relating to outcomes of operation of the machine;

(b) maintaining a list of episodes, corresponding to sequences identified within the historical database, which satisfy a relevance criteria relative to a current sequence of parameters, said relevance criteria employing a relevance function corresponding to an overall measure of similarity between the current sequence of parameters and the episode derived by combining a plurality of similarity functions, values of said relevance function for each episode in said list being updated based on recently input parameters;

(c) performing a randomized selection between a plurality of actions or sequences of actions, at least one of said actions or sequences of actions being derived from an episode in said list that had a favorable outcome of operation of the machine; and (d) outputting to the machine at least one control signal indicative of the selected action or sequence of actions to be performed.

15. The method of claim 14, wherein said randomized selection is weighted towards selection of a similar episode with a most favorable outcome.

16. The method of claim 14, wherein said randomized selection is performed between a plurality of actions or sequences of actions including a random action.

17. The method of claim 14, wherein at least part of said historical database is provided as a pre-stored database containing a simulated history.

18. The method of claim 14, further comprising updating said historical database with: recent sequences of parameters relating to the operating environment; corresponding actions taken; and corresponding outcomes of operation of the machine.

19. The method of claim 14, wherein said maintaining a list of episodes comprises:

(a) after receipt of new inputs, reevaluating said relevance criteria relative to an updated current sequence of parameters and discarding episodes no longer satisfying said relevance criteria; and (c) intermittently performing a search of said historical database to identify additional episodes satisfying said relevance criteria relative to the updated current sequence of parameters for inclusion in said list.

20. The method of claim 14, wherein the machine is an additional artificial intelligence controller operating according to a number of operating parameters, and wherein said at least one control signal include a control signal for changing a value of at least one of said operating parameters of said additional artificial intelligence controller.

21. The method of claim 14, wherein said maintaining a list and said randomized selection are performed according to settings defined by at least one operating parameter, and wherein a value of said at least one operating parameter is changed in response to an input received from an additional artificial intelligence controller.

22. The method of claim 14, wherein said parameters relating to the operating environment are sensed, at least in part, by a set of sensors deployed for sensing parameters relating to the operating environment of the machine.

23. The method of claim 22, wherein said set of sensors includes a range sensor deployed for sensing a distance from at least part of the machine to an object in the operating environment.

24. The method of claim 22, wherein said set of sensors includes an imaging sensor, and wherein said processing system is further configured to perform image processing on images sampled by said imaging sensor to derive parameters relating to the operating environment.

25. The method of claim 22, wherein said set of sensors includes an audio input, and wherein said processing system is further configured to perform sound processing on signals sampled by said audio input.

26. The method of claim 14, wherein the machine is a virtual machine operating in a computer-generated virtual environment.

* * * * *